March 23, 1965  W. LÖLIGER ETAL  3,174,506
HOMOGENIZING APPARATUS
Filed Oct. 1, 1962
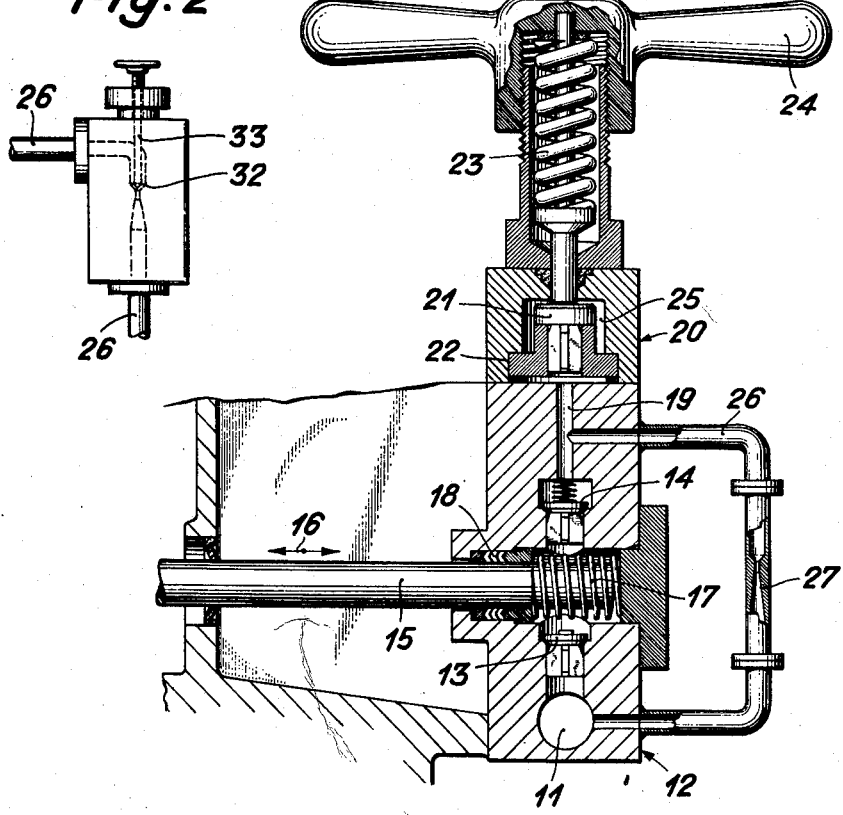
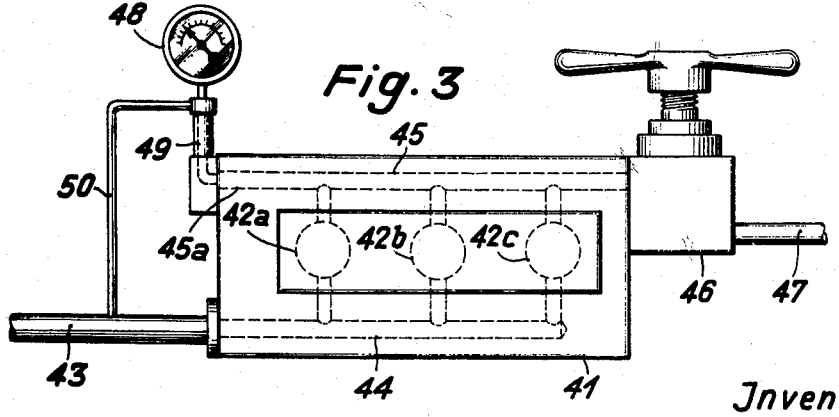
Inventors:
WILLI LÖLIGER
RUDOLF SCHMIED
by K. A. May
ATTORNEY.

3,174,506
HOMOGENIZING APPARATUS
Willi Löliger, Konolfingen, and Rudolf Schmied, Tonisbach, Konolfingen, Switzerland, assignors to Alpura AG, Bern, Switzerland, a corporation of Switzerland
Filed Oct. 1, 1962, Ser. No. 227,434
Claims priority, application Switzerland, Oct. 3, 1961, 11,496/61
4 Claims. (Cl. 137—563)

This invention relates to a homogenizing apparatus for liquids, comprising a high-pressure pump and an expansion device.

It is possible today to sterilize milk and other liquids by heating very briefly to temperatures in the neighborhood of 150° C., without impairing the properties of such liquids. If milk suitably treated in this way is filled under sterile conditions into closed containers or packings, the milk can be stored for a relatively long period at room temperature; this, however, necessitates very careful homogenization in addition to complete destruction of all germs present in the raw milk. In particular, the homogenization must crush the fat particles to such an extent that creaming does not occur even during a relatively long period of storage.

Conventional homogenization usually includes increasing the pressure on the milk, for example, to 200 kg. per sq. cm. by means of a volumetric pump, and immediately thereupon expansion of the milk through one or more narrow, slotlike flow areas. These slotlike areas are usually formed by the seat and valve body of a valvelike device, the valve body being pressed against the valve seat by adjustable spring pressure. The thereby produced homogenization effect depends essentially on the pressure upstream of the slotlike flow area, and the crushing of the individual fat particles depends on the action of frictional and shearing forces and cavitation phenomena.

It has now been found that with the conventional piston pumps used to raise the pressure of the milk, the pressure at the inlet of the homogenization valve is subject to fluctuation because of the uneven delivery during a stroke. These pressure fluctuations prevent a uniform homogenizing effect.

It is an object of the invention to substantially eliminate this disadvantage by providing a conduit which connects the inlet and the outlet of the pump for returning a partial quantity of the liquid from the delivery side to the intake side of the pump.

With the arrangement according to the invention the pressure in front of the expansion device is extensively smoothed and the material to be treated is homogenized more uniformly. A further advantage obtained is that the output of the homogenizing apparatus can be easier adjusted to suit one or more packing machines downstream of the homogenization apparatus. To accomplish this it was heretofore necessary to return expanded liquid from the flow path after the expansion device to the pump intake pipe. The disadantage of such arrangement is that the quantity of liquid returned flows through the homogenization device a second time, causing in some cases harmful changes of the properties of the liquid. In the case of milk, for example, protein particles agglomerate with the milk fat to such an extent that an undesirable "floury" taste occurs. With the invention, repeated homogenization is avoided by recycling a partial quantity of the liquid before it flows through the expansion device.

The recycling arrangement according to the invention permits an improved initial sterilization of the entire flow path. On the delivery side of the pump, in particular, there are spaces where there is not much flow and which are heated inadequately or not at all during the initial passage of hot water or hot steam through the apparatus before normal operation. If the recycling pipe is connected to such spaces of inadequate flow, there is an effective flow of the heat carrier used for initial sterilization and hence reliable destruction of any germs.

The recycling pipe may advantageously contain a throttling element in the form of a Venturi-like cross-sectional construction; the effect of this is that the partial quantity of liquid flowing through the recycling conduit is expanded with a minimum of impairment. Suitable means may be provided for adjusting the partial quantity of liquid returned through the recycling pipe.

The invention and further associated features thereof will be described hereinbelow with reference to the exemplified embodiments illustrated in the drawing, wherein:

FIG. 1 is a sectional view of the high-pressure pump and the homogenization valve of a homogenizing apparatus.

FIG. 2 shows an adjustable throttling element having a Venturi-like cross-sectional constriction.

FIG. 3 shows a recycling conduit connected to a deficient flow zone on the delivery side of a pump operating with three pistons.

The homogenization apparatus shown in FIG. 1 is used particularly for the treatment of milk, which is fed through a supply pipe (not shown) to an inlet chamber 11 of a high-pressure pump 12. The latter comprises an intake valve 13, a delivery valve 14 and a pump piston 15, which is reciprocated in the direction of the arrows 16 by a crank drive (not shown). A spring 17 serves to compress a packing 18. On the delivery or outlet side of the pump, the milk flows through a bore 19 into a homogenization valve 20. The homogenization valve consists essentially of a valve element 21 cooperating with a valve seat 22. The valve element 21 is subjected to the action of a spring 23 which can be adjusted by means of a handle 24. When the apparatus is in operation, the milk flows at high speed through a narrow slot formed between the valve seat 22 and the valve element 21 and leaves a space 25 surrounding the element 21 through a pipe, not shown, which conducts the milk, for example, to a cooler wherefrom the milk flows to a packing machine.

According to the invention, a conduit 26 connects the bore 19 between the pump and the expansion device with the inlet chamber 11. This conduit serves to recycle a partial quantity of liquid from the delivery side to the intake side of the pump. To maintain the pressure drop between the intake and delivery sides of the pump, the conduit 26 contains a throttling element constructed as a Venturi-like cross-sectional constriction 27. The throttling element 27 may be replaced by an element having a flow area whose size depends upon the required ratio between the quantity of liquid to be recycled and the quantity flowing into the homogenization valve 20. Alternatively, a throttling element having an adjustable flow area may be used as shown in FIG. 2. In this embodiment the inlet of the restriction 32 is in the form of a valve and a valve needle can be moved towards and away from the narrowest cross-section.

FIG. 3 shows a pump housing 41 provided with three pump cylinders 42a, 42b and 42c. The milk or liquid to be treated flows through a pipe 43 into the bore 44 corresponding to the chamber 11 in FIG. 1 and, when the pump is in operation, the liquid is forced into a bore 45, i.e. to the delivery side of the pump. The liquid then flows through a homogenization valve 46 into a pipe 47.

For initial sterilization of the apparatus described, the pump is started and, for example, hot water is supplied through the pipe 43 under pressure at a temperature of 150° C., for example. This hot water follows the same path as is subsequently followed by the liquid to be treated. A part 45a of the bore 45 and a bore 49 leading into a pressure gauge 48 are supplied only inadequately or not at all with hot water and are not heated or are only inadequately heated. If a recycling conduit 50 intended for the return of a partial quantity of liquid from the delivery side to the intake side of the pump is connected according to the invention to the area or dead space which, otherwise, is inadequately heated, i.e. to the bore 49 leading to the pressure gauge 48, a partial quantity of the heat carrier used for the initial sterilization flows through the part 45a of the bore 45 and through the bore 49, ensuring reliable destruction of any germs in the otherwise insufficiently sterilized area.

The invention is not restricted to the exemplified embodiments illustrated. Other forms of high-pressure pumps and expansion devices, for example, a homogenization valve having two-stage expansion may be used.

We claim:
1. A homogenizing apparatus comprising:
   a high-pressure pump having an inlet and an outlet,
   a conduit connected to said outlet,
   an expansion device connected to said conduit for receiving liquid from said pump and reducing the pressure of the liquid, said expansion device including adjustable means for maintaining a predetermined pressure in said conduit, and
   a pipe containing a rigid flow restricting means and connected to said conduit between said outlet and said expansion device and connected to said pump inlet for returning a portion of the liquid pumped by said pump to the pump inlet.

2. A homogenizing apparatus comprising:
   a high-pressure pump having an inlet and an outlet, said outlet including a dead space wherein the liquid is substantially stagnant,
   a conduit connected to said outlet,
   an expansion device connected to said conduit for receiving liquid from said pump and reducing the pressure of the liquid,
   the dead space of said outlet communicating with said conduit upstream of said expansion device, and
   a pipe connected to said dead space of said outlet and to said inlet for returning a portion of the liquid pumped by said pump through said dead space from said outlet to said inlet.

3. A homogenizing apparatus as defined in claim 1 wherein said flow restricting means is of venturi configuration.

4. A homogenizing apparatus as defined in claim 1 wherein said flow restricting means is of venturi configuration and includes adjusting means for adjusting the flow area of said restricting means for varying the rate of flow of liquid therethrough.

References Cited by the Examiner
UNITED STATES PATENTS

| | | | |
|---|---|---|---|
| 1,744,842 | 1/30 | Suverkrop | 138—44 |
| 2,022,481 | 11/35 | Schellenger | 137—563 |
| 2,087,621 | 7/37 | Lorraine | 251—124 |
| 2,832,573 | 4/58 | Rees | 259—4 |

M. CARY NELSON, *Primary Examiner.*